US011015653B2

(12) United States Patent
Werner et al.

(10) Patent No.: US 11,015,653 B2
(45) Date of Patent: May 25, 2021

(54) SLIDE BEARING FOR A SUPPORT MOUNT, METHOD FOR PRODUCING A SLIDE BODY AND METHOD FOR PRODUCING A SLIDE BEARING

(71) Applicant: VIBRACOUSTIC GMBH, Darmstadt (DE)

(72) Inventors: Philipp Werner, Lüneburg (DE); Hilrich Kardoes, Winsen (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 0 days.

(21) Appl. No.: 16/487,980

(22) PCT Filed: Feb. 22, 2018

(86) PCT No.: PCT/EP2018/054437
§ 371 (c)(1),
(2) Date: Aug. 22, 2019

(87) PCT Pub. No.: WO2018/154017
PCT Pub. Date: Aug. 30, 2018

(65) Prior Publication Data
US 2020/0025253 A1    Jan. 23, 2020

(30) Foreign Application Priority Data

Feb. 24, 2017 (DE) .................... 10 2017 103 940.6

(51) Int. Cl.
*F16C 35/02* (2006.01)
*F16C 17/10* (2006.01)
*F16C 33/20* (2006.01)

(52) U.S. Cl.
CPC .............. *F16C 35/02* (2013.01); *F16C 17/10* (2013.01); *F16C 33/206* (2013.01);
(Continued)

(58) Field of Classification Search
CPC ........ F16C 17/10; F16C 17/107; F16C 17/18; F16C 33/206; F16C 2208/66;
(Continued)

(56) References Cited

U.S. PATENT DOCUMENTS 8,596,661 B2 * 12/2013 Kaneko ................ B60G 15/068
280/124.155
8,740,233 B2 * 6/2014 Morishige ............ B60G 15/068
280/124.155
(Continued)

FOREIGN PATENT DOCUMENTS

DE    2308947 A1    11/1973
DE    7701761 U1    6/1977
(Continued)

OTHER PUBLICATIONS

E.R. Booser, Michael Khonsari. "Systematically Selecting the Best Grease for Equipment Reliability", https://www.machinerylubrication.com/Read/970/best-grease-reliability. Jul. 17, 2010. (Year: 2010).*
(Continued)

*Primary Examiner* — Alan B Waits
(74) *Attorney, Agent, or Firm* — Fishman Stewart PLLC

(57) ABSTRACT

A slide bearing for a support mount of a motor vehicle includes a first housing part, a second housing part, and a slide bearing device arranged between the two housing parts. In embodiments, the slide bearing device includes at least a first slide body and at least a second slide body. With embodiments, at least a section of the first slide body is made of a hybrid material. A method of producing a slide body and a method of producing a slide bearing are also disclosed.

19 Claims, 4 Drawing Sheets

(52) U.S. Cl.
CPC ........ *F16C 33/208* (2013.01); *F16C 2208/32* (2013.01); *F16C 2208/60* (2013.01); *F16C 2208/66* (2013.01); *F16C 2208/70* (2013.01); *F16C 2208/78* (2013.01)

(58) Field of Classification Search
CPC .............. F16C 2208/78; F16C 2326/05; F16C 2208/32; F16C 2208/60; F16C 2208/70; F16C 33/208; B60G 15/06; B60G 15/067; B60G 15/068; B60G 35/02
See application file for complete search history.

(56) References Cited

U.S. PATENT DOCUMENTS

| | | | |
|---|---|---|---|
| 8,998,497 B2 | 4/2015 | Kaneko | |
| 2006/0215944 A1* | 9/2006 | Watai | F16C 17/04 |
| | | | 384/420 |
| 2010/0040317 A1* | 2/2010 | Kellam | F16C 33/20 |
| | | | 384/482 |
| 2010/0104228 A1* | 4/2010 | Kaneko | B60G 15/068 |
| | | | 384/420 |
| 2011/0019951 A1* | 1/2011 | Kaneko | F16C 33/20 |
| | | | 384/420 |
| 2011/0049834 A1 | 3/2011 | Natu | |
| 2016/0069112 A1 | 3/2016 | Neumark et al. | |
| 2016/0273582 A1 | 9/2016 | Fisher | |
| 2017/0158012 A1* | 6/2017 | Hubert | F16C 19/163 |

FOREIGN PATENT DOCUMENTS

| | | |
|---|---|---|
| DE | 2935205 A1 | 4/1981 |
| DE | 3939704 A1 | 6/1991 |
| DE | 19545425 A1 | 6/1997 |
| DE | 102008057590 A1 | 2/2010 |
| DE | 102009056351 A1 | 6/2011 |
| DE | 102014102125 A1 | 8/2015 |
| DE | 102015217416 A1 | 10/2016 |
| EP | 2574481 A2 | 4/2013 |
| JP | 2012097904 A | 5/2012 |
| JP | 2013204810 A | 10/2013 |

OTHER PUBLICATIONS

Machine Translation of DE 19545425 (Year: 1997).*
International Search Report PCT/EP2018/054437, dated Jun. 25, 2018.
Chinese Office Action, 201880013350.8, dated Mar. 27, 2020 (with an English translation of text).

* cited by examiner

SLIDE BEARING FOR A SUPPORT MOUNT, METHOD FOR PRODUCING A SLIDE BODY AND METHOD FOR PRODUCING A SLIDE BEARING

CROSS-REFERENCE TO RELATED APPLICATIONS

This application is a National Stage Patent Application of International Patent Application No. PCT/EP2018/054437, filed Feb. 22, 2018, which claims the benefit of German Application Serial No. 10 2017 103 940.6, filed Feb. 24, 2017, the contents of each are incorporated by reference in their entireties.

TECHNICAL FIELD

The present invention relates to a slide bearing for a support mount of a motor vehicle, comprising a first housing part, a second housing part and a slide bearing device arranged between the two housing parts. Furthermore, the invention relates to a method for producing a slide body and a method for producing a slide bearing.

BACKGROUND

A slide bearing of the type mentioned above may be used in support mounts of steered axles to allow rotation between a vehicle body and the spring, which may be part of a strut, in particular a McPherson strut.

The slide bearing is mounted in a support mount, which can also be described as a "top mount". The forces introduced into the spring or damper are transferred to the vehicle structure via the support mount.

A slide bearing of the type mentioned above can also be used in air springs of motor vehicles in order to protect the air spring bellows from damage by torsion, since torsional movements can occur even with non-steered axles due to the axle kinematics.

In addition to axial ball bearings, axial slide bearings are used to absorb the rotational movement. An axial slide bearing comprises an annular disc-shaped slide body which is arranged between two housing parts. Since a pure axial slide bearing can slip laterally when radial forces occur, a device for absorbing radial forces must also be provided to ensure radial guidance. This may be an integral part of the slide bearing.

Such a slide bearing is revealed in U.S. Pat. No. 8,998,497 B2 which has two plastic housing parts and a slide bearing device arranged between them. The slide bearing device comprises an annular disc-shaped slide body made of plastic, a metal reinforcing ring and a sleeve-shaped slide body made of plastic.

In addition, DE 10 2008 057 590 A1 reveals a slide bearing with a plastic housing consisting of two housing parts. Between the housing parts, an upper thrust washer and a lower thrust washer made of metal, a thrust washer made of synthetic resin, an inner sleeve, an outer sleeve and a synthetic resin sleeve are arranged.

EP 2 574 481 A2 also reveals a slide bearing comprising a first housing part and a second housing part, an axially acting slide bearing device being provided between the two housing parts. The slide bearing device has a metallic annular disc and a polymeric plastic sliding disc.

Furthermore, DE 10 2009 056 351 A1 reveals a strut slide bearing arrangement with a strut slide bearing which is formed from a lower bearing shell, an upper bearing shell and at least one sliding element. A reinforcement is integrated into the lower bearing shell, which is designed in the form of a perforated disk and has a flat annular surface on which the slide element rests directly and which thus forms the lower slide surface.

SUMMARY

The present invention is based on the task of creating a slide bearing for a support mount that has improved sliding properties and is also robust and cost-efficient. Furthermore, a method for producing a slide body and a method for producing a slide bearing with improved sliding properties shall be created.

In order to solve the problem, a slide bearing with the features of claim 1, a method with the features of claim 21 and a method with the features of claim 23 are proposed.

Advantageous embodiments of the slide bearing and the method for producing a slide body are revealed in the respective dependent claims.

According to the invention, the slide bearing for a support mount has a first housing part, a second housing part and a slide bearing device arranged between the two housing parts, wherein the slide bearing device has at least a first slide body and at least a second slide body, and wherein at least a portion of the first slide body is made of a hybrid material.

The slide bearing is preferably used as a support mount for a motor vehicle. A motor vehicle is understood to be both a passenger car and a commercial vehicle. The slide bearing may be used in a strut support mount for a strut to allow rotation between a vehicle body and a spring that is part of the strut. The slide bearing may also be used with an air spring to compensate for torsional movements caused by bump-steer on steered and non-steered axles during compression.

In the present case, hybrid material is understood to mean a composite material which is a combination of metallic, ceramic and/or polymeric materials, the composite material preferably being formed as a layered composite of at least two of these materials. The base layer may also be referred to as a supporting body, carrier or substrate.

Since at least one portion of the first slide body is made of a hybrid material formed as a layered composite, the slide bearing has good sliding properties and high robustness. In addition, a slide body produced from a hybrid material can be produced cost-efficiently. In an advantageous embodiment, the entire first slide body is made of a hybrid material. Additionally, a plurality of first slide bodies and/or second slide bodies may be provided, which are preferably arranged in an annular manner and are at least partially made of a hybrid material.

Advantageously, the first housing part has a first support section and a first sleeve section. It is advantageous that the first sleeve section protrudes vertically from the first support section. Advantageously, the second housing part has a second support section and a second sleeve section. It is advantageous that the second sleeve section protrudes vertically from the second support section. The two sleeve sections form an opening, for example to accommodate a shock absorber. A portion of the first sleeve section is advantageously inserted into a recess formed in the second part of the housing. The slide bearing arrangement is advantageously arranged between the support sections and the sleeve sections.

In an advantageous embodiment, the hybrid material has a base layer and a sliding layer. The base layer is preferably made of a stronger and/or stiffer material than the sliding layer. It is also advantageous that the base layer is associated with the housing part, whereas the sliding layer is associated with the second slide body. The sliding layer may be smooth or rough. If the sliding layer is rough, the depressions of the unevenness may serve as a reservoir for a lubricant. Advantageously, the sliding surface has an average roughness depth (Rz) between approximately 20 and approximately 65, preferably between approximately 30 and approximately 55.

Advantageously, the sliding layer bears against the second slide body in a sliding manner. The sliding layer thus functions as a sliding partner for the second slide body. The sliding layer and the second slide body may slide against each other to allow rotational relative movement between a vehicle body and the spring.

In an advantageous embodiment, the base layer is made of metal. The metal base layer serves to distribute the loads better in an upper housing part of a support mount, since the forces introduced into the slide bearing by a spring may occur unevenly distributed over the circumference of the slide bearing. This allows peak loads introduced into the upper part of the housing to be better distributed and the overall system to be more robust.

Advantageously, the sliding layer and/or the second slide body are made of plastic or a plastic compound. Thus the sliding layer made of plastic together with the second slide body made of plastic form an effective sliding pairing. As a result, the slide bearing has good sliding properties. In particular, the plastic sliding layer forms a functional polymer sliding layer. Advantageously, the plastic of the sliding layer as well as that of the slide body are a semi-crystalline polymer. Advantageously, the two plastics are not identical, but are matched to each other as a tribological system in terms of low wear and low breakaway torques. Advantageously, the sliding layer is made of polyamide, polyoxymethylene, polytetrafluorethylene (PTFE) or polyethylene.

In an advantageous embodiment, the sliding layer and the second slide body form a sliding pairing either of two different polymers from the groups of polyamides (PA), polyoxymethylenes (POM), polyketones (PK), fluoropolymers, e.g. polytetrafluoroethylene (PTFE), polyethylene terephthalate (PET) or polybutylene terephthalate (PBT), or the sliding pairing is formed from polyketone against polyketone, the polymers of the sliding pairing each being present in a continuous, thermoplastic polymer phase.

By using a sliding combination of two thermoplastic polymers from the groups PA, POM, PK, PET, PBT and PTFE, very good tribological properties can be achieved cost-efficiently if both layers form a continuous thermoplastic polymer phase. The second slide body is preferably produced by injection moulding, while the sliding layer is applied to the metallic base layer by means of a powder coating process. The sliding pairing ensures low wear of both friction partners, low breakaway torques, a low friction coefficient and is cost-efficient.

The sliding layer and the second slide body consist of different plastic classes of the classes polyamide (PA), polyoxymethylene (POM), polyketone (PK), fluoropolymers, e.g. polytetrafluoroethylene (PTFE), polyethylene terephthalate (PET) or polybutylene terephthalate (PBT). Alternatively, both of the sliding layer and the second slide body may also be made of polyketone. In addition, the friction pairing consisting of continuous phases of PA, POM, PK, PTFE, PET or PBT has low adhesive forces and thus a low coefficient of friction and therefore improved sliding properties. Since the sliding layer forms a closed polymer layer on the base layer, the sliding layer serves as a corrosion layer for the metallic base layer. The sliding layer may be applied to the base layer by powder coating, in particular by electrostatic powder coating. For this purpose, the sliding layer is provided in the form of a powder, which is applied to the base layer in the powder coating process, in particular in the electrostatic powder coating process. Furthermore, the sliding layer may be applied to the base layer by means of coil coating. The second slide body made of plastic may be produced by injection moulding, in the case of PTFE e.g. by pressing and sintering.

It has also been established that the use of a sliding layer of polyoxymethylene, polyamide, polyketone, polytetrafluoroethylene, polyethylene terephthalate or polybutylene terephthalate does not require any precision finishing of the metallic support layer. In addition, the metallic base layer does not have to be hardened in order to minimise wear, since the polymer sliding layer, and not the metal, forms the sliding partner. Rather, the sliding layer of polyoxymethylene, polyketone, polytetrafluoroethylene, polybutylene terephthalate or polyamide is applied to a surface of the metallic substrate for the sliding layer that is suitable for adhesion and can be produced cost-efficiently, for example a blasted surface or a conversion layer. During the remelting process that follows the electrostatic powder coating process, for example in a continuous furnace, in which the powder is brought into the closed surface layer, the polymer cools very slowly and can therefore form high degrees of crystallinity on the surface, too. The result is a highly crystalline, particularly slightly rough surface, which minimises wear and virtually eliminates unwanted running-in effects.

Since the roughness is caused by the crystallization process, it tends to increase with an increasing degree of crystallinity. The co-polymer of polyoxymethylene has a particularly high degree of crystallinity with approximately 75% and thus a particularly distinct roughness. In lubricated systems, this roughness leads to a particularly good tribological behaviour, since the depressions of the rough surface serve as lubricant reservoirs on a microscopic scale. The combination of a sliding layer of polyoxymethylene with a slide body of polyamide or polyketone, using a lubricant, is therefore a particularly preferred sliding pairing.

In addition, semi-crystalline polymers such as polyoxymethylene, polyamide, polyethylene terephthalate, polybutylene terephthalate, polytetrafluoroethylene or polyketone, which are applied to the substrate as a sliding layer by means of electrostatic powder coating, have a very high degree of crystallinity after the remelting process close to the theoretically maximum achievable value, in particular on the surface, too. The injection skin observed in injection moulding, which is often characterised by a high amorphous content, but also by the segregation of possible additives, is not observed in powder coating. This results in an excellent wear resistance, so that running-in effects are almost completely avoided and the sliding pairing shows constant sliding properties throughout the entire operating life.

In an advantageous embodiment, polyoxymethylene is a polyoxymethylene copolymer (POM-C) or a polyoxymethylene homopolymer (POM-H). POM-C or POM-H is preferably used as a sliding layer. POM-C has a degree of crystallinity of approximately 75% and exhibits particularly high toughness and abrasion resistance. If polyoxymethylene is used as a slide body, POM-H is an advantageous choice because the theoretical degree of crystallinity of POM-H is even higher at approximately 90%, thus creating a hybrid material of particularly high hardness and strength. As a result, the slide bearing has a long operating life. A polybutylene terephthalate can also be used as an alternative to POM, especially if its higher melting point is required. For example, an elastomer could be vulcanised directly onto a PBT sliding sleeve.

In an advantageous embodiment, the polyamide is an aliphatic polyamide or a partially aromatic polyamide. A sliding friction partner used from the group of polyamides is inexpensive, particularly wear-resistant against polyoxymethylene as a friction partner and has good sliding properties in this combination. Aliphatic polyamides may be polyamide 6 (PA6), polyamide 12 (PA12), polyamide 46 (PA46), polyamide 66 (PA66) or polyamide 666 (PA666).

In an advantageous embodiment, the sliding layer and/or the second slide body has at least one additive. This improves the sliding properties of the sliding layer.

In an advantageous embodiment, the polyamide and/or the polyoxymethylene and/or the polybutylene terephthalate and/or the polyketone have at least one additive. This further improves the tribological properties of the sliding pairing. In addition, additives improve the mechanical and/or thermal properties of the plastic. It is advantageous that at least one additive is incorporated into the polymer sliding layer forming the continuous layer in such a way that the additive is also arranged in the surface of the continuous sliding layer and can thus immediately become tribologically active there. This can be achieved by the fact that the plastic powder for the sliding coating is a compound of polyamide or polyoxymethylene, polybutylene terephthalate or polyketone and the additive or additives.

In an advantageous embodiment, the additive has polytetrafluoroethylene (PTFE), molybdenum disulfide (MoS2), silicone oils, graphite, graphene, carbon nanofibers and/or carbon nanotubes. The additive may also contain carbon fibres, aramid fibres, boron nitrite minerals, talcum, oils, waxes, glass beads and/or glass fibres. The additives improve the tribological emergency running properties in dry running or optimise other mechanical properties without having a significant negative influence on the tribological properties. The additives are mixed with the main polymer component in a process step upstream of powder coating by means of compounding, homogenised, ground and then made available as powder. If this powder is applied to the slide body in an electrostatic powder coating process, a very homogeneous distribution of the additives up to the outer layer can be achieved in combination with a high degree of crystallinity of the outer layer. The danger of segregation, such as occurs in varnishing processes or powder coating processes based on duromers, is almost completely eliminated, as well as the tendency towards an amorphous outer layer typical for injection moulding processes. As a result, the sliding pairing has uniform tribological properties throughout the entire operating life.

In an advantageous embodiment, the plastic has a degree of crystallinity of at least 80% of its maximum theoretical value on the surface of the sliding layer.

In an advantageous design, an adhesive layer is arranged between the base layer and the sliding layer. The adhesive layer ensures improved adhesion of the sliding layer to the base layer. The adhesive layer may also be referred to as the primer layer. In an advantageous embodiment, the adhesive layer is based on an epoxy resin.

In an advantageous embodiment, the sliding layer is applied to the base layer by varnishing or powder coating. Advantageously, a sliding layer of polyamide, polyoxymethylene, polytetrafluoroethylene (PTFE), polyketone or polybutylene terephthalate is applied to the base layer during powder coating. Due to the morphology of the tribologically stressed polymer layer, high degrees of crystallinity can be achieved, resulting in a lower wear rate.

The sliding layer is preferably applied by means of an electrostatic powder coating process. This allows a homogeneous, continuous sliding layer of polyoxymethylene, polyamide, polyketone, polytetrafluorethylene or polybutylene terephthalate to be applied to the base layer at low cost. If a sliding layer of one of the thermoplastics mentioned is applied by means of an electrostatic powder coating process, a statistical distribution of the additives can be achieved in such a way that the additives are already present on the surface of the polymer layer in the new condition immediately after the coating. Then they are immediately mobile there and can immediately have a tribologically active effect with almost no running-in effects. Furthermore, the electrostatic powder coating process, in which the powder mixture is heated, for example, in a circulating furnace and remelted on the substrate, leads during the final slow cooling process to a uniform, continuous polymer layer with a degree of crystallinity close to the theoretical maximum which is almost homogeneous over the entire cross-section. Furthermore, a nearly closed polymer layer can be applied to the inner tube by means of powder coating, which serves as very good corrosion protection for the inner tube. The resulting roughness is due to the crystallite formation on the surface and is jointly responsible for the excellent tribological properties, especially in lubricated systems. In an advantageous embodiment, the sliding layer has a thickness between approximately 50 μm and approximately 300 μm, in particular between approximately 70 μm and approximately 150 μm. As a result, the sliding layer has a high mechanical resistance and serves as corrosion protection for the metallic substrate.

In an advantageous design, the first slide has a breakthrough. The breakthrough is used to hang up the first slide body for the powder coating process. The breakthrough may have a round hole or the shape of a sleeve. In particular, the breakthrough has no sliding surface on a side facing the centre of the breakthrough, so this area can be used for hanging up during a powder coating process and may have defects in the coating. The breakthrough allows the first slide body to be hung up in a cost-effective manner during the powder coating process.

In an advantageous design, the sliding layer, in particular the functional sliding layer, is applied to a side of the base layer facing away from the housing part. The functional sliding layer is the sliding layer that glides against the second slide body. This means that the side of the base layer facing the housing part can be used to hang up the slide body for the powder coating process. The functional sliding layer in the radial slide body section is applied to a side of the base layer facing away from the housing part. Thus, in the radial slide body section, the side of the base layer facing the housing part is used for hanging up for the powder coating process.

In an advantageous embodiment, the first slide body and/or the second slide body has an axial slide body section for absorbing axial forces and/or a radial slide body section for absorbing radial forces. This allows the slide bearing to transmit both axial and radial forces. The two slide body sections are preferably joined together in a material-fitting manner. The two slide body sections may also be separated from each other. The axial slide body section may have the shape of an annular disc and the radial slide body section may be sleeve-shaped. Preferably, the radial slide body section protrudes vertically from the axial slide body section. The axial slide body sections are advantageously associated with the support sections of the housing parts, and the radial slide body sections with the sleeve sections of the housing parts.

In an advantageous embodiment, the first slide body has a first slide ring for absorbing radial forces and/or the second slide body has a second slide ring for absorbing radial forces. The slide rings may be made of a polymer, a polymer compound, a metal or a hybrid material. If the slide bodies have a slide ring, then the sections of the slide bodies absorbing the axial forces are designed as ring washers.

In an advantageous embodiment, a lubricant is provided between the slide bodies. The lubricant reduces friction between the two slide bodies and improves breakaway and sliding properties. Since the plastic has a degree of crystallinity of at least 80% of its maximum theoretical value on the surface of the sliding layer, the sliding layer has a rough, uneven surface. As a result, the lubricant may accumulate in the unevenness, so that the depressions in the unevenness serve as a lubricant reservoir.

In an advantageous design, the lubricant is a grease which has a consistency index of between approximately 1 and approximately 4, in particular between approximately 2 and approximately 3. The consistency index refers to the NLGI class according to DIN 51818.

In an advantageous embodiment, at least one recess, at least one bead, at least one groove and/or a structuring, such as elevations or projections, is introduced into the first slide body and/or into the second slide body. The at least one recess, the at least one bead, the at least one groove and/or the structuring can serve as a reservoir for the lubricant. This improves the sliding properties of the slide bearing. Furthermore, the at least one recess, the at least one bead, the at least one groove and/or the structuring can serve to position the two slide bodies. The recess may be circular in plan view. In addition, the recess may be designed in a radially circumferential manner. In addition, a large number of recesses, grooves and beads may be provided in either of the sliding elements and may be arranged at equidistant distances from one another. It is also conceivable that at least one or more recesses, grooves and/or beads are provided in both slide bodies. In addition, the recess, groove and/or bead may have a width approximately equal to the total width of the slide body. In addition, at least one recess, at least one groove, at least one bead and/or one structuring may be incorporated in a slide ring.

In an advantageous embodiment, the first slide body and/or the second slide body is connected to the first housing part and/or the second housing part in a form-fitting, force-fitting or material-fitting manner. The slide bodies can be pressed into support sections and/or sleeve sections of the housing parts. Furthermore, the slide bodies may be glued to the housing parts. Advantageously, both housing parts are made of fibre-reinforced plastic. This allows the second slide body made of plastic to be produced together with one of the housing parts in two-component plastic injection moulding.

In an advantageous embodiment, the first slide body and/or the second slide body is of annular disc-shaped and/or hat-shaped design. In particular, if the sliding layer is applied to the base layer by powder coating, it is advantageous if the slide body can be hung up. This occurs in the opening or the breakthrough of the slide body designed as a ring disk. If the slide body is hat-shaped, the sleeve-shaped section is used to hang the slide body. If the first slide body and/or second slide body is annular disc-shaped, an additional slide ring may be provided to absorb the radial forces. The slide ring then forms the radial slide body section of the first slide body and/or the second slide body. The slide ring may be made of the first material or the hybrid material.

In an advantageous embodiment, the first housing part and/or the second housing part is made of plastic. The housing parts are preferably made of fibre-reinforced plastic. As a result, the slide bearing has a low weight and is also inexpensive to produce. In addition, the two housing parts can be produced in die-cast aluminium.

Furthermore, the invention concerns a process for the production of a slide body from a hybrid material for a slide bearing. The procedure comprises the following steps. First, a base layer is provided. The base layer may be either a metal strip, a metal plate or a tubular metallic blank. The base layer is transformed into an annular disc-shaped or hat-shaped body, e.g. punched, deep-drawn, cut and/or otherwise formed or by means of a turning process. The annular disc-shaped body need not explicitly be flat, but may, for example, have a deep-drawn collar inside and/or outside, at least one recess, at least one groove, at least one bead and/or structure for positioning and/or as a reservoir for a lubricant. Subsequently, a powdered plastic or powdered plastic compound forming the sliding layer is applied to the base layer by means of electrostatic powder coating. Finally, the plastic or plastic compound forming the sliding layer is melted and cooled. Due to the electrostatic powder coating it is possible to first transform a metallic base layer into its final geometry and then to coat the base layer in its final geometry. Thus, in contrast to coil coating, the coating process is independent of the geometry of the base layer or of the geometry of the annular disc-shaped body, since no reshaping of the coating takes place. Since the sliding layer completely surrounds the base layer, the cutting edges and/or forming edges are protected against corrosion. This makes it possible to use an unalloyed steel as the base layer. For powder coating, the base layer is advantageously hanged up. Advantageously, the base layer is hanged up in the region of a breakthrough. The term annular disc-shaped is understood to be a shape which is as far as possible rotationally symmetrical and which contains at least one circular sliding surface on which a second slide body can rotate at least partially. Explicitly, however, the annular disc shape may also have non-circular features such as at least one recess, at least one bead and/or at least one groove for aligning the annular disc.

The metallic base layer is pretreated in an advantageous design. In particular, the base layer is cleaned to remove grease, rust and/or dirt from the surface of the base layer and thus improve the adhesion of the sliding layer or adhesion enhancer to the base layer.

In an advantageous embodiment, an adhesive layer is applied to the metallic base layer before the plastic is applied. The adhesive layer improves the adhesion of the plastic or plastic compound to the base layer.

Furthermore, the invention relates to a process for producing a slide bearing. The procedure comprises the following steps. First, a first housing part and a second housing part are injection moulded from plastic. A first slide body and a second slide body are then connected to the first housing part and/or the second housing part in a form-fitting, force-fitting and/or material-fitting manner. Finally, the two housing parts are connected so that the two slide bodies abut against each other in a sliding manner.

BRIEF DESCRIPTION OF THE DRAWINGS

Below, the slide bearing and other features and advantages are explained in more detail using exemplary embodiments, which are shown schematically in the figures. Shown are.

DETAILED DESCRIPTION

Figure 1:
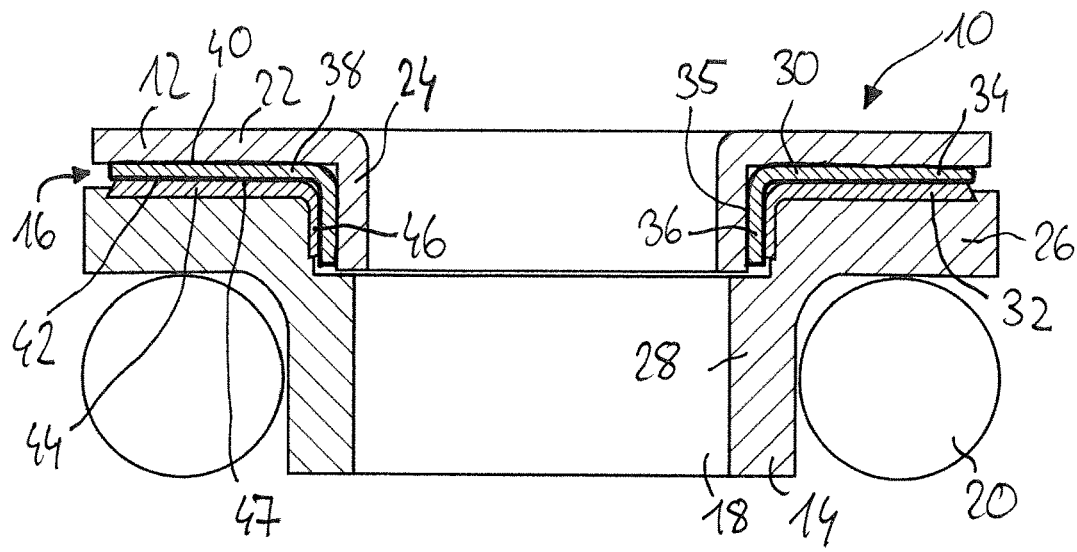
FIG. 1 a longitudinal section through a slide bearing according to a first embodiment.

FIG. 1 shows a slide bearing 10 which is loaded by a spring 20 which may be part of an unrepresented strut, particularly a McPherson strut, to allow rotation between an unrepresented vehicle body and the spring.

The slide bearing 10 has a first housing part 12, a second housing part 14 and a slide bearing device 16 arranged between the two housing parts 12, 14.

The two housing parts 12, 14 may be made of a plastic, in particular of a fibre-reinforced plastic or by means of aluminium die-casting, and form a central opening 18, which may serve to accommodate a section of an unrepresented shock absorber of a strut. The first housing part 12 is supported by an unrepresented vehicle body. The second housing part 14 is supported by the spring 20. The two housing parts 12, 14 can be rotated relative to each other via the slide bearing device 16.

Instead of the spring 20, the lower part of the housing 14 may also be connected to an air spring which is not shown. In this case, the lower part of the housing 14 may be part of a rolling piston of the air spring, for example.

The first housing part 12 has a first support section 22 and a first sleeve section 24 that protrudes vertically from the first support section 22. The second housing part 14 has a second support section 26 and a second sleeve section 28 that protrudes vertically from the second support section 26. The spring 20 bears against the second support section 26 and the second sleeve section 28. The two sleeve sections form the central opening 18, whereby one section of the first sleeve section 24 is inserted into the second housing part 14.

The slide bearing device 16 has a first slide body 30 and a second slide body 32.

The first slide body 30 is hat-shaped and has a first axial slide body section 34 to absorb the axial forces acting on the slide bearing 10 and a first radial slide body section 36 to absorb the radial forces acting on the slide bearing 10. The first radial slide body section 36 projects vertically from the axial slide body section 34 and has a circular breakthrough 35. As shown in FIG. 1, the first axial slide body section 34 rests on the first support section 22, and the first radial slide body section 36 rests on the first sleeve section 24. The first slide body 30 may be connected to the first housing part 12 in a form-fitting, force-fitting and/or material-fitting manner.

Figure 2:
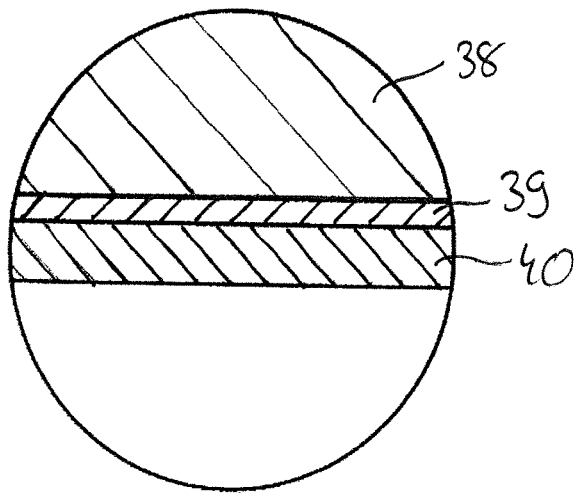
FIG. 2 an enlarged representation of a section through a hybrid material.
Figure 3:
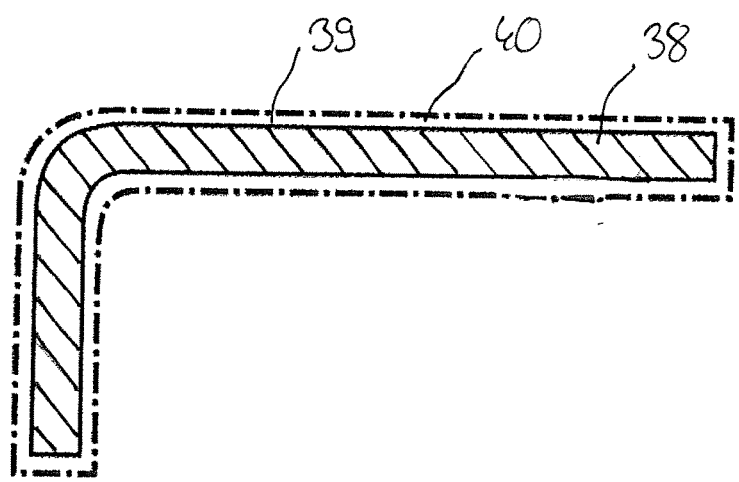
FIG. 3 a schematic representation of the sliding layer which completely surrounds the base layer.

The first slide body 30 is made of a hybrid material, which is designed as a composite layer. Due to the hybrid material formed as a layered composite, the first slide body 30 has a base layer 38, an adhesive layer 39 and a sliding layer 40, as shown in particular in FIG. 2. The base layer 38 is made of a metal and abuts against the first housing part 12. The adhesive layer 39, for example, is based on an epoxy resin. As shown schematically in FIG. 3, the sliding layer 40 and the adhesive layer 39 (both shown together in dashed lines) surround the base layer 38 completely.

The sliding layer 40 has a first sliding surface 42 and thereby forms a continuous polymer layer on the base layer 38, the sliding layer 40 being of polyamide (PA), polyoxymethylene (POM), polyketone (PK), polytetrafluoroethylene (PTFE), polyethylene terephthalate (PET) or polybutylene terephthalate (PBT) and may be provided with tribological additives.

Polyoxymethylene may be a polyoxymethylene copolymer (POM-C) or a polyoxymethylene homopolymer (POM-H). The polyamide may be an aliphatic polyamide or a partially aromatic polyamide. Aliphatic polyamides may be polyamide 6 (PA6), polyamide 12 (PA12), polyamide 46 (PA46), polyamide 66 (PA66) or polyamide 666 (PA666).

The additive may contain PTFE, molybdenum disulfide (MoS2), graphite, graphene, carbon nanofibres, carbon fibres, aramid fibres, boron nitrite minerals, talcum, oils, waxes, glass beads, glass fibres and/or carbon nanotubes. The additive may be statistically embedded in the sliding layer 40 in such a way that the additive is also arranged directly on the surface of the sliding layer 40 and can therefore be tribologically effective immediately.

The sliding layer 40 may be applied to the base layer 38 by varnishing or electrostatic powder coating. If the sliding layer 40 is applied by electrostatic powder coating, then the breakthrough 35 is used to hang up the first slide body 30. In particular, the inner side of the radial slide section 36 forming the breakthrough 35 is used for hanging up. The inner side may also be provided with a sliding layer, which, however, may have defects as it does not serve as a functional sliding layer. The sliding layer 40 applied to the adhesive layer by means of electrostatic powder coating preferably has a thickness between approximately 50 μm and approximately 300 μm, in particular between approximately 80 μm and approximately 200 μm.

The second slide body 32 is hat-shaped and has a second axial slide body section 44 for receiving the axial forces acting on the slide bearing 10 and a second radial slide body section 46 for receiving the radial forces acting on the slide bearing 10, which projects perpendicularly from the second axial slide body section 44.

The second slide body 32 is made of plastic or a plastic compound, in particular of semi-crystalline plastic as a base polymer, and is connected to the second housing part 14 in a material-fitting manner, the second axial slide body section 44 being embedded in the second support section 26 and the second radial slide body section 46 being embedded in the second sleeve section 28. The second slide body 32 has a second sliding surface 47 which slides against the first sliding surface 32, so that the two slide bodies 30, 32 slide against each other when the two housing parts 12, 14 are rotated against each other.

If the sliding layer is 40 of polyamide, then the second slide body is 32 of polyoxymethylene, polyethylene terephthalate, polybutylene terephthalate or polyketone. If the sliding layer is 40 of polyoxymethylene, then the second slide body is polyamide, polyethylene terephthalate, polybutylene terephthalate or polyketone. If the sliding layer is 40 of polybutylene terephthalate, then the second slide body is 32 of polyoxymethylene, polyamide, or polyketone. If the sliding layer is 40 of polyketone, then the second slide body 32 is of polyamide, polyethylene terephthalate, polybutylene terephthalate or polyoxymethylene, but may also be of polyketone.

In addition, the second slide body 32 may also have an additive. The additive may be polytetrafluoroethylene (PTFE), graphite, boron nitride, carbon nanofibres, carbon fibres, aramid fibres, minerals, molybdenum disulphide, talcum, oils, waxes, glass beads and/or glass fibres.

The second housing part 14 and the second slide body 32 may be produced using the two-component plastic injection moulding process. First the second housing part 14 is injection moulded, and then the second slide body 32 is injection moulded onto the second housing part 14 and joined with the latter in a material-fitting manner.

The following describes a possible method for producing the first slide body 30 and a method for producing the slide bearing 10.

First, in order to produce the first slide body 30, either a flat metallic base layer 38 or a tubular metallic blank is provided as the base layer 38. The base layer is transformed into an annular disc-shaped body, e.g. punched, deep-drawn, cut and/or otherwise formed or by means of a turning process. This annular disc-shaped body need not explicitly be flat, but may, for example, have a deep-drawn collar on the inside and/or outside, at least one recess, at least one groove and/or at least one bead for positioning and/or as a reservoir for a lubricant or a structuring on the subsequent sliding surface. The base layer 38, which has been formed into a disc-shaped body, is then pretreated or cleaned to remove grease, rust and/or dirt from the surface of the base layer 38. Subsequently, an adhesive layer 39 is applied to the metallic base layer 38. The base layer 38 is then hanged up in the region of the breakthrough 35, and a powdered plastic or powdered plastic compound forming the sliding layer 40 is applied to the base layer 38 by means of electrostatic powder coating. Finally, the plastic or plastic compound forming the sliding layer 40 is melted and cooled.

In order to produce the slide bearing 10, the two housing parts 12 and 14 are first injection moulded from plastic. Then, the second slide body 32 is injection-moulded onto the second housing part 14 and joined with the latter in a material-fitting and/or form-fitting manner. Then the first slide body 30 is connected to the first housing part 12 in a form-fitting, force-fitting and/or material-fitting manner. Finally, the two housing parts 12, 14 are connected to each other in such a way that the two slide bodies 30, 32 abut against each other in a sliding manner.

Furthermore, it is not absolutely necessary to injection-mould the second slide body 32 to the second housing part 14, but the second slide body may simply be inserted into the second housing part 14. Also, it is not necessarily the case that the first slide body 30 is inserted into the first housing part 12, but the first slide body 30, after a lubricant has been applied to one of the slide bodies 30, 32, could be loosely mounted on the second slide body 32 and then the first housing half 12 would be lowered to the second housing half. This ensures that the first slide body 30 is held in a form-fitting manner between the two housing halves 12, 14.

The following describes further designs for the slide bearing 10, with the same reference signs being used for identical and functionally identical parts.

Figure 4:
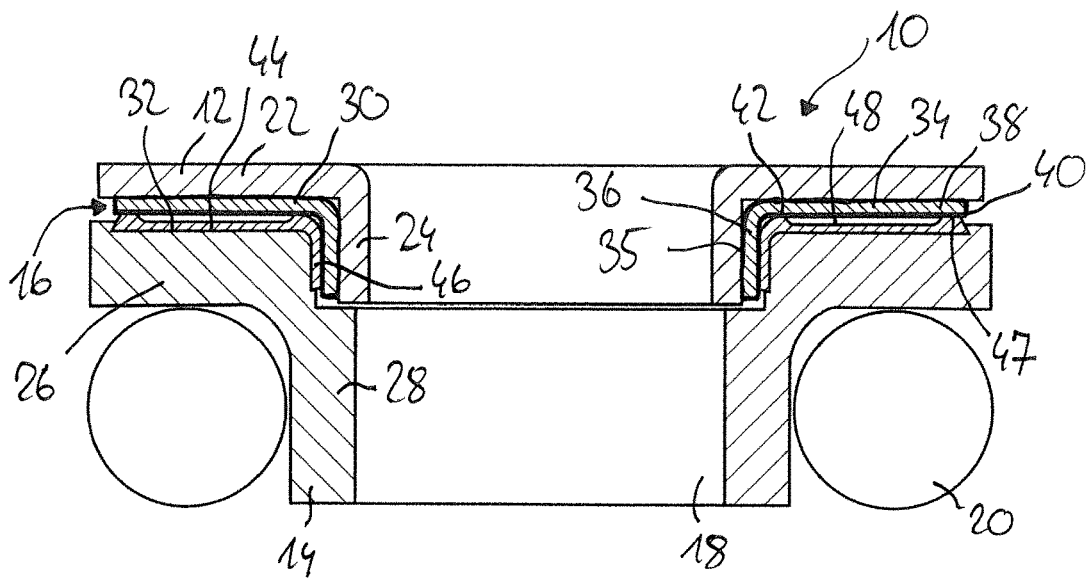
FIG. 4 a longitudinal section through a slide bearing according to a second embodiment.

FIG. 4 shows a second embodiment of the slide bearing 10 which differs from the first embodiment in that the second body 32 has recesses 48 which serve as lubricant reservoirs. The recess 48 extends approximately over the entire width of the second slide body 32 and is designed as a large number of radial grooves. The recess 48 may also be designed as a circumferential annular groove. Several circumferential annular grooves are also conceivable. In addition, the recesses 48 may have a round, oval or any other contour. In addition, differently contoured recesses 48 may be provided in the second slide body 32.

Figure 5:
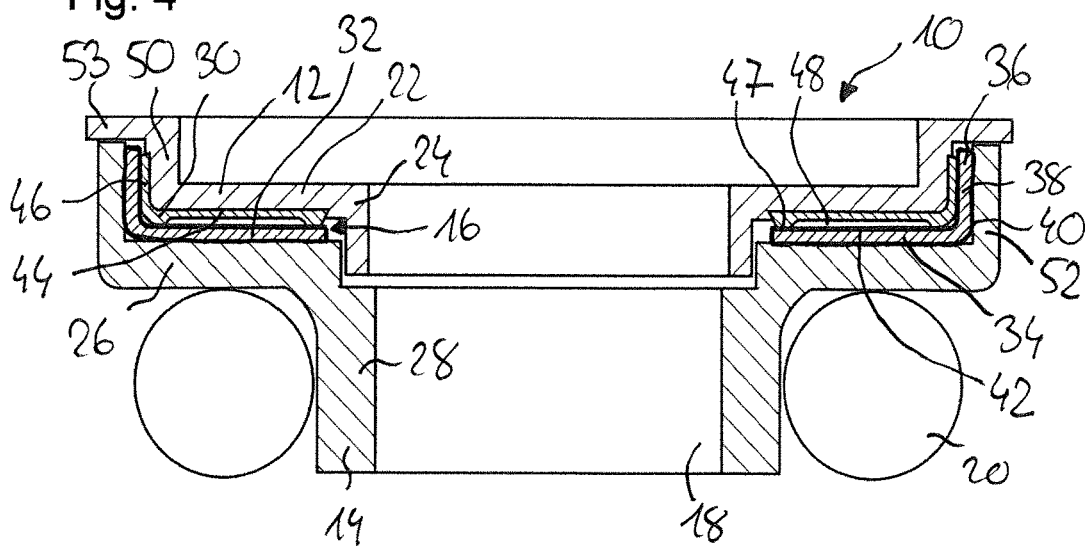
FIG. 5 a longitudinal section through a slide bearing according to a third embodiment.

FIG. 5 shows a third embodiment of the slide bearing 10, which differs from the first two embodiments in that the two radial slide body sections 36, 46 are arranged radially outside and project upwards, i.e. away from the spring 20. For this purpose, the first slide body 30 abuts to the second housing part 14 and the second slide body 32 abuts to the first housing part 12.

To support the two radial slide body sections 36, 46, the first housing part 12 has a third sleeve section 50, in which the radial slide body section 46 of the second slide body 32 is embedded in a form-fitting and/or material-fitting manner. The second housing part 14 has a fourth sleeve section 52, against which the radial slide body section 36 of the first slide body 30 abuts. In order to seal the slide bearing device 16, the first housing part 12 has a collar section 53 which, together with the fourth sleeve section 52, can form a seal, for example an unrepresented labyrinth seal. Since the cutting edge of the circular breakthrough of the first slide body 30 is not a functional surface, the breakthrough can be used to hang up the component during the powder coating process.

Figure 6:
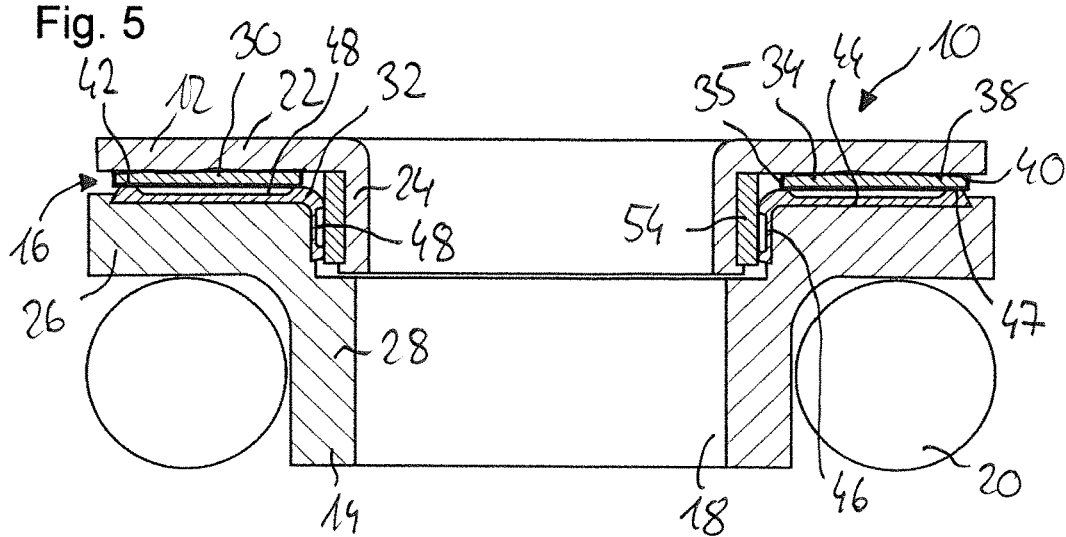
FIG. 6 a longitudinal section through a slide bearing according to a fourth embodiment.

FIG. 6 shows a fourth embodiment of the slide bearing 10, which differs from the other embodiments in that the first slide body 32 has an annular disc shape and the first radial slide body section 36 is formed by a separate first slide ring 54. The annular disc-shaped first slide body 32 is punched out of metal and is hanged up via the breakthrough 35 for electrostatic powder coating. Since the sliding layer 40 completely surrounds the base layer 38, the cutting edges are protected against corrosion.

In order to improve the sliding properties between the first slide ring 54 and the second radial slide body section 46, recesses 48 have been provided in the second radial slide body section which serve as lubricant reservoirs. The first slide ring 54 may be made of a polymer, a polymer compound, a metal or a hybrid material.

Figure 7:
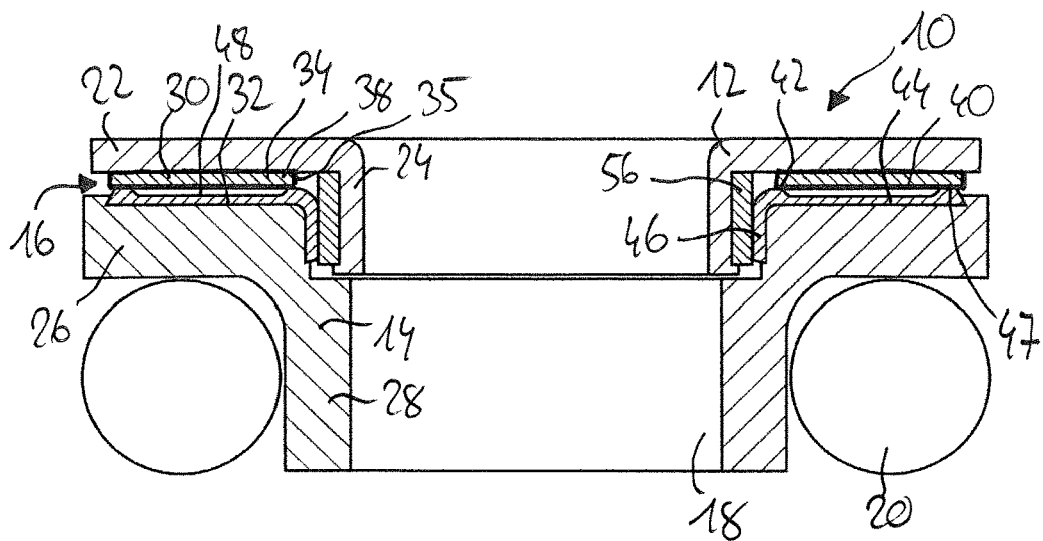
FIG. 7 a longitudinal section through a slide bearing according to a fifth embodiment.

FIG. 7 shows a fifth design of the slide bearing 10, which differs from the fourth design in that no recesses 48 are made in the second radial slide body section 46.

Figure 8:
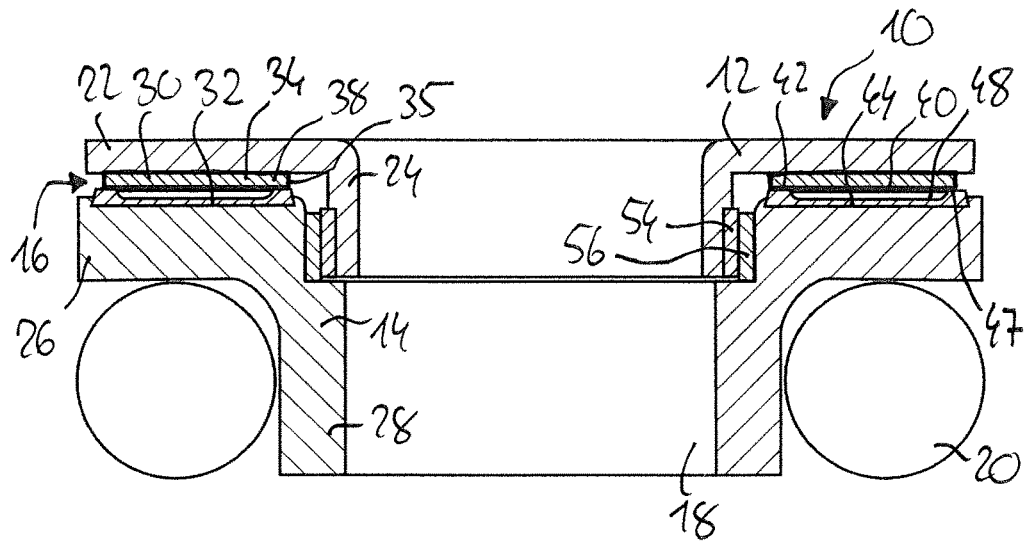
FIG. 8 a longitudinal section through a slide bearing according to a sixth embodiment.

FIG. 8 shows a sixth embodiment of the slide bearing 10, which differs from the other embodiments in that the two slide bodies 30, 32 have the shape of an annular disc. The first slide body 30 has the breakthrough 35 via which the base layer 38 is hanged up for electrostatic powder coating. The radial slide body sections 36, 46 are formed from the separate first slide ring 54 and a separate second slide ring 56. The two seal rings 54 may be made of a polymer, a polymer compound, a metal or a hybrid material.

Figure 9:
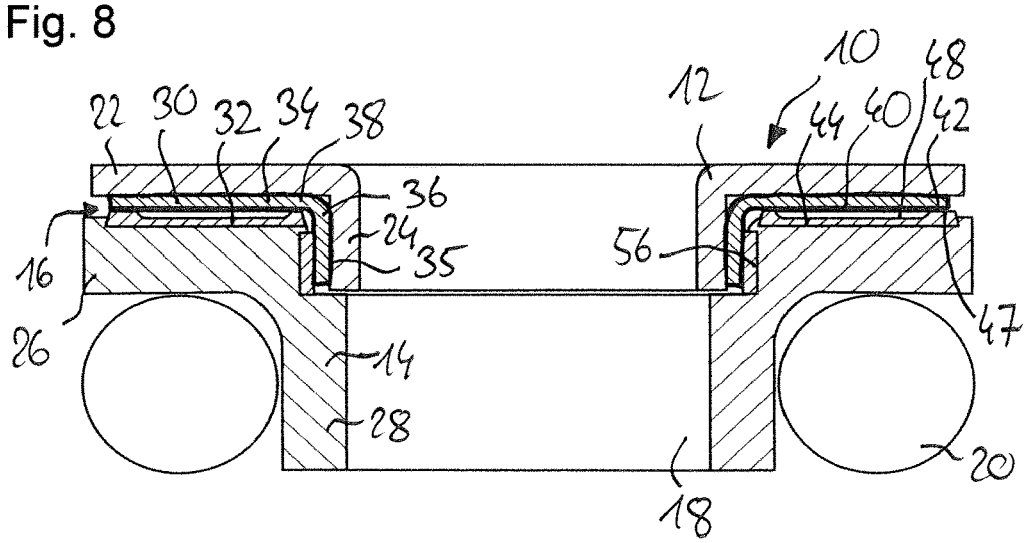
FIG. 9 a longitudinal section through a slide bearing according to a seventh embodiment.

FIG. 9 shows a seventh embodiment of the slide bearing 10, which differs from the first embodiment in that the second radial slide body section 46 is formed from the second slide ring 56, against which the first radial slide body section 34, in particular the sliding layer 40, abuts in a sliding manner.

Figure 10:
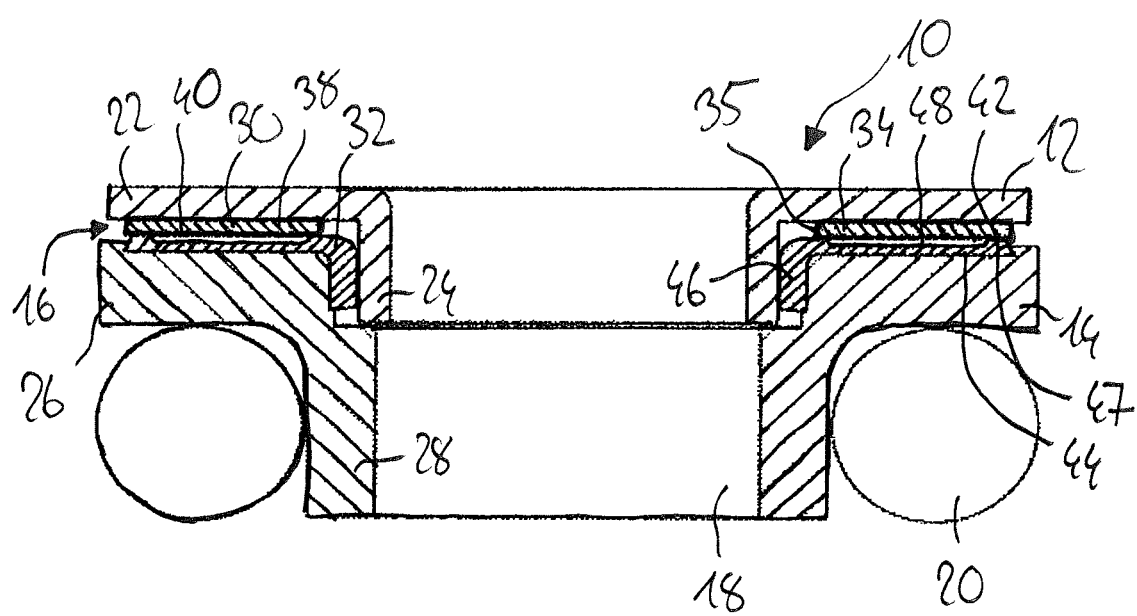
FIG. 10 a longitudinal section through a slide bearing according to an eighth embodiment.

FIG. 10 shows an eighth embodiment of the slide bearing 10, which differs from the other embodiments in that the first slide body 30 does not have a radial slide body section 36. Compared to the other designs, this variant is particularly cost-effective because the base layer 38 of the first slide body 30 does not have to be deep-drawn from metal, but

The invention claimed is:

1. A slide bearing for a support mount of a motor vehicle, comprising:
a first housing part,
a second housing part, and
a slide bearing device arranged between the two housing parts, the slide bearing device having at least one first slide body and at least one second slide body,
wherein at least a portion of the first slide body is comprised of a hybrid material having a base layer and a sliding layer; wherein the sliding layer and the second slide body form a sliding pairing, each of the sliding layer and the second slide body made of a polymer present in a continuous, thermoplastic polymer phase, and one of:
the polymers of the sliding layer and the second slide body are different polymers from the groups of polyamides (PA), polyoxymethylenes (POM), polyketones (PK), polytetrafluoroethylenes (PTFE), polyethylene terephthalates (PET) or polybutylene terephthalates (PBT) such that the sliding pairing is made of two different polymers, or
the polymers of the sliding layer and the second slide body are both polyketone such that the sliding pairing is formed of polyketone against polyketone;
wherein the sliding layer is applied to at least a portion of the base layer of the at least a portion of the first slide body by powder coating to have a degree of crystallinity of at least 80% of the coating polymer's maximum theoretical crystallinity on a surface of the sliding layer.

2. The slide bearing according to claim 1, wherein the sliding layer bears slidingly against the second slide body.

3. The slide bearing according to claim 1, wherein the base layer is made of metal.

4. The slide bearing according to claim 1, wherein the sliding layer and/or the second slide body has at least one additive.

5. The slide bearing according to claim 4, wherein the additive comprises polytetrafluoroethylene, MoS2, silicone oils, graphite, graphene, carbon nanofibres and/or carbon nanotubes.

6. The slide bearing according to claim 1, wherein an adhesive layer is included between the base layer and the sliding layer.

7. The slide bearing according to claim 1, wherein the first slide body has at least one breakthrough.

8. The slide bearing according to claim 1, wherein the first slide body and/or the second slide body has an axial slide body section for absorbing axial forces and/or a radial slide body section for absorbing radial forces.

9. The slide bearing according to claim 8, wherein the first slide body and/or the second slide body is of annular and/or hat-shaped design in which the respective radial slide body section extends from the respective axial slide body section.

10. The slide bearing according to claim 1, wherein the first slide body has a first slide ring for absorbing radial forces and/or the second slide body has a second slide ring for absorbing radial forces.

11. The slide bearing according to claim 1, wherein a lubricant is provided between the first slide body and the second slide body.

12. The slide bearing according to claim 11, wherein the lubricant is a grease having a consistency index of between approximately 1 and approximately 4.

13. The slide bearing according to claim 11, wherein the lubricant is a grease having a consistency index of between approximately 2 and approximately 3.

14. The slide bearing according to claim 1, wherein at least one recess, at least one bead, at least one groove and/or one structuring is provided in the first slide body and/or in the second slide body.

15. The slide bearing according to claim 1, wherein at least one of:
the first slide body and/or the second slide body is connected in a form-fitting, force-fitting and/or material-fitting manner to the first housing part; and
the second slide body is connected in a form-fitting, force-fitting and/or material-fitting manner to the second housing part.

16. The slide bearing according to claim 1, wherein the first housing part and/or the second housing part is made of plastic.

17. A method for producing a slide bearing, comprising:
injection moulding or aluminum die casting a first housing part and a second housing part, each made of plastic or aluminum;
connecting in a form-fitting, force-fitting and/or material-fitting manner a first slide body with the first housing part, and a second slide body made of plastic with the second housing part; and
connecting the two housing parts so that the two slide bodies abut slidably against each other;
wherein the first slide body is produced from a hybrid material by:
providing a metallic base layer;
transforming the base layer to a disc-shaped or hat-shaped body having an annular disc and a sleeve-shaped section extending therefrom;
applying a powdered plastic or powdered plastic compound forming a sliding layer to at least a portion of the base layer by electrostatic powder coating to form a degree of crystallinity of at least 80% of the coating polymer's maximum theoretical crystallinity on a surface of the sliding layer; and
melting and cooling of the plastic or plastic compound to form the sliding layer;
wherein the sliding layer and the second slide body form a sliding pairing, each of the sliding layer and the second slide body made of a polymer present in a continuous, thermoplastic polymer phase, and one of:
the polymers of the sliding layer and the second slide body are different polymers from the groups of polyamides (PA), polyoxymethylenes (POM), polyketones (PK), polytetrafluoroethylenes (PTFE), polyethylene terephthalates (PET) or polybutylene terephthalates (PBT) such that the sliding pairing is made of two different polymers, or
the polymers of the sliding layer and the second slide body are both polyketone such that the sliding pairing is formed of polyketone against polyketone.

18. The method according to claim 17, wherein the metallic base layer is pretreated.

19. The method according to claim 17, wherein an adhesive layer is applied to the metallic base layer before the plastic is applied.

* * * * *